United States Patent
Miyake et al.

(10) Patent No.: US 7,990,866 B2
(45) Date of Patent: Aug. 2, 2011

(54) SERVER DEVICE, METHOD FOR CONTROLLING A SERVER DEVICE, AND METHOD FOR ESTABLISHING A CONNECTION USING THE SERVER DEVICE

(75) Inventors: Motoharu Miyake, Yokosuka (JP);
Tomohiro Nakagawa, Yokosuka (JP);
Hiroshi Inamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1404 days.

(21) Appl. No.: 11/192,608

(22) Filed: Jul. 29, 2005

(65) Prior Publication Data
US 2006/0023721 A1     Feb. 2, 2006

(30) Foreign Application Priority Data
Jul. 29, 2004   (JP) ................. 2004-221859

(51) Int. Cl.
*G01R 31/08* (2006.01)
(52) U.S. Cl. ...................................... 370/235
(58) Field of Classification Search ............ 370/230, 370/229, 235, 389, 461, 349, 231
See application file for complete search history.

(56) References Cited

U.S. PATENT DOCUMENTS

| | | | | | |
|---|---|---|---|---|---|
| 5,802,106 | A | * | 9/1998 | Packer | 375/225 |
| 5,914,953 | A | * | 6/1999 | Krause et al. | 370/392 |
| 6,457,054 | B1 | * | 9/2002 | Bakshi | 709/227 |
| 6,650,621 | B1 | * | 11/2003 | Maki-Kullas | 370/238 |
| 6,789,119 | B1 | * | 9/2004 | Zhu et al. | 709/227 |
| 7,562,147 | B1 | * | 7/2009 | Cohen | 709/228 |
| 2001/0042200 | A1 | | 11/2001 | Lamberton et al. | |
| 2002/0141448 | A1 | * | 10/2002 | Matsunaga | 370/469 |
| 2004/0008681 | A1 | | 1/2004 | Govindarajan et al. | |
| 2004/0202329 | A1 | * | 10/2004 | Jung et al. | 380/273 |
| 2006/0170566 | A1 | * | 8/2006 | Slemmer et al. | 340/932.2 |
| 2006/0256756 | A1 | * | 11/2006 | Wakabayashi | 370/335 |

FOREIGN PATENT DOCUMENTS

| | | |
|---|---|---|
| CN | 1630248 | 6/2005 |
| EP | 0 998 098 A2 | 5/2000 |

OTHER PUBLICATIONS

Schuba, C. L. et al., "Analysis of a Denial of Service Attack on TCP", *Security and Privacy, Proceedings*, 1997 IEEE Symposium on Oakland, CA, May 4-7, 1997, pp. 208-223.
Chinese Office Action dated Jan. 19, 2007.
Lemon, J., "Resisting SYN Flood DoS Attacks with a SYN Cache", *Syncache/Syncookies paper*, USENIX BSDC Conference, Year 2002, 11 Page.
Stevens, W. Richard, "TCP/IP Illustrated, vol. 1, The Protocols," pp. 250-252, Addison Wesley Pub (Sd) 1994.

* cited by examiner

*Primary Examiner* — Dang T Ton
*Assistant Examiner* — Nourali Mansoury
(74) *Attorney, Agent, or Firm* — Brinks Hofer Gilson & Lione

(57) ABSTRACT

When a connection is established between a client device and a server device, a first message requesting establishment of a downlink connection is transmitted from the client device to the server device, and a server device which has received the first message is caused to transmit to the client device a second message requesting establishment of an uplink connection. The client device which has received the second message is caused to transmit to the server device a third message acknowledging the second message and requesting establishment of the downlink connection. The server device which has received the third message is caused to establish the downlink connection based on the content of the third message.

18 Claims, 5 Drawing Sheets

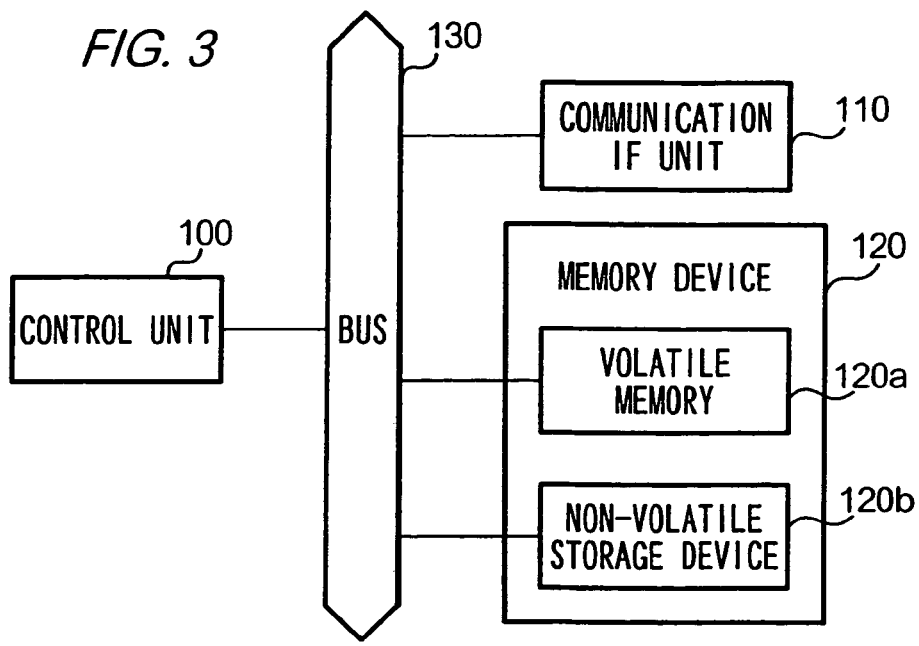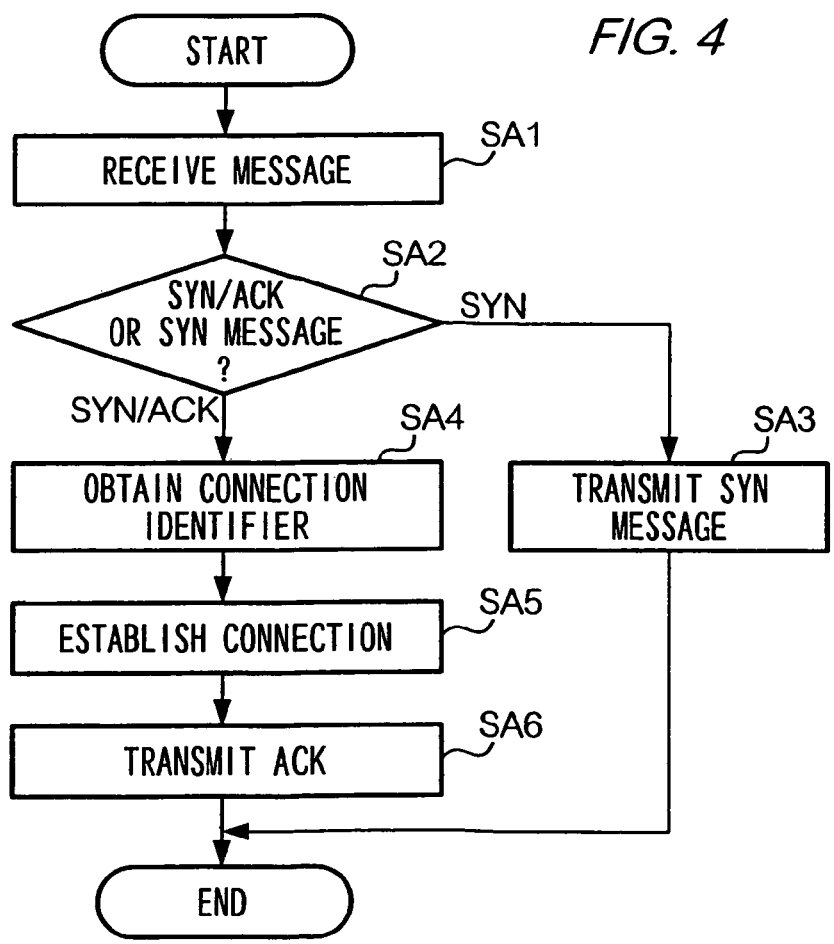

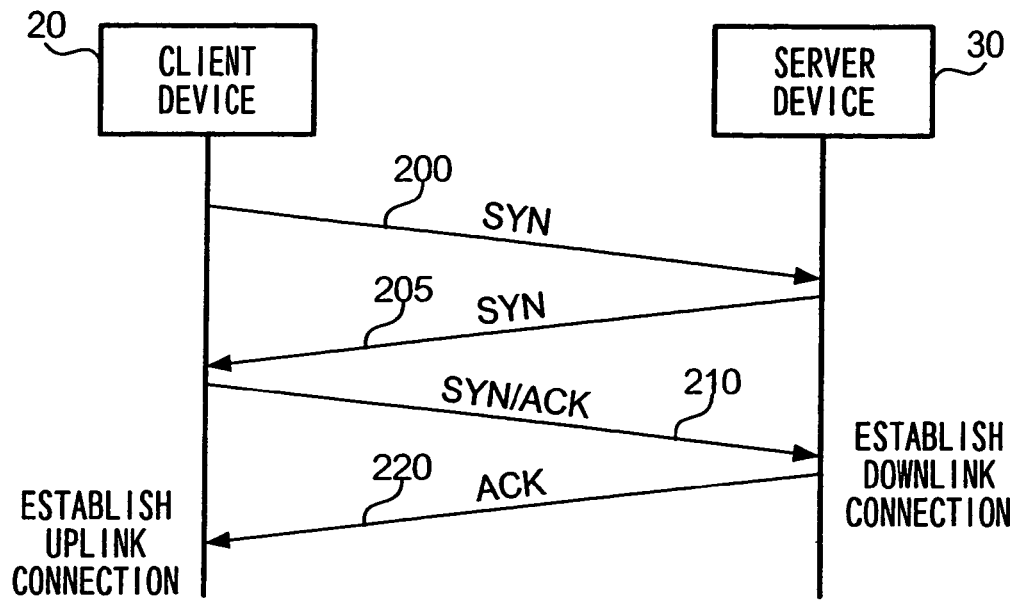
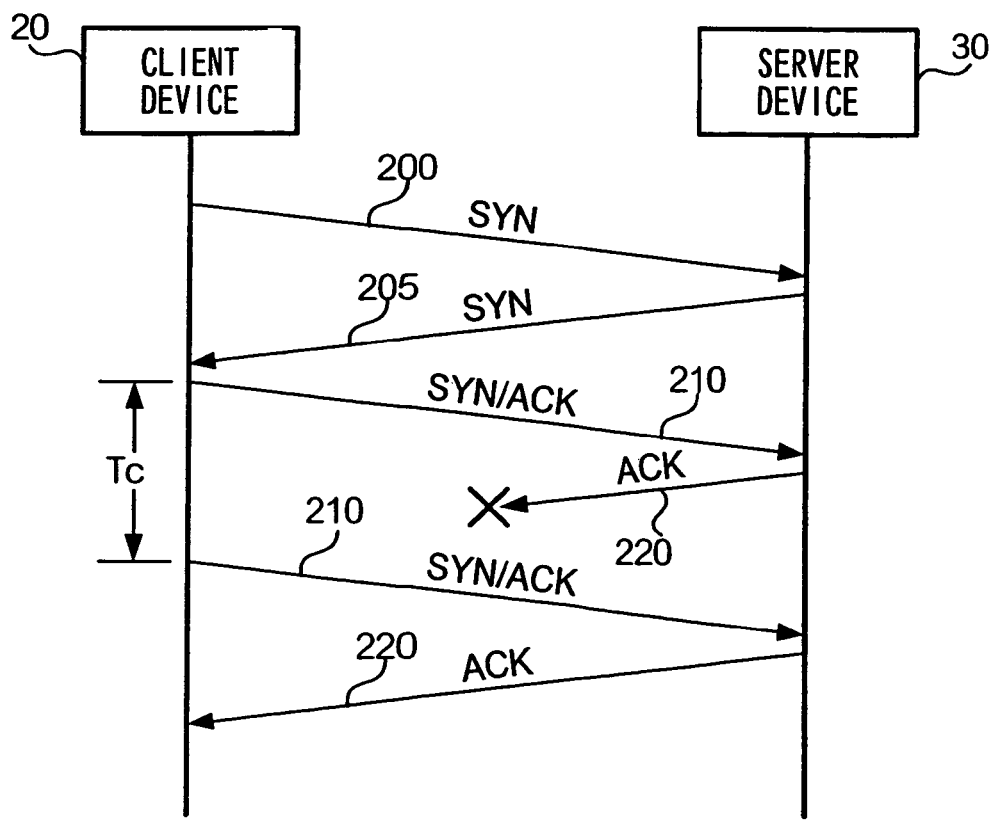

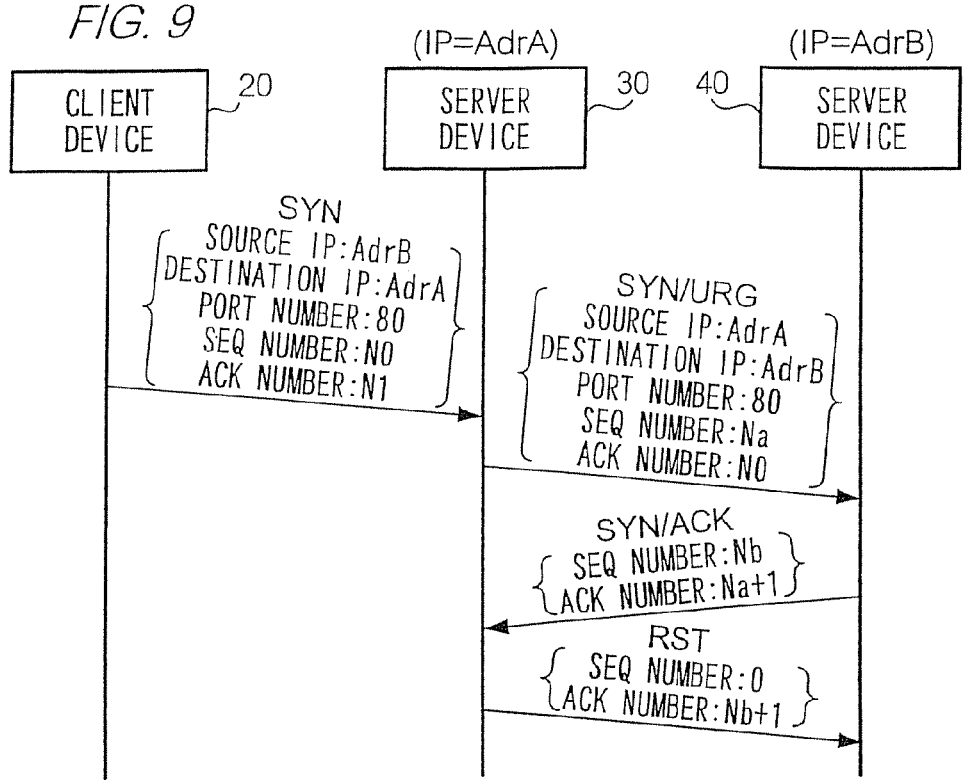
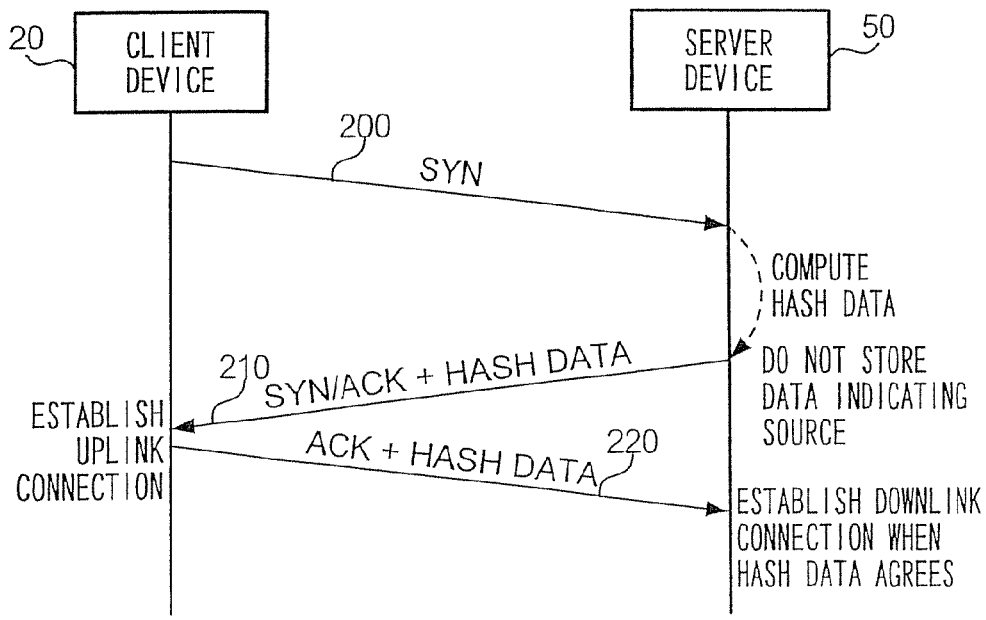
FIG. 11 PRIOR ART

SERVER DEVICE, METHOD FOR CONTROLLING A SERVER DEVICE, AND METHOD FOR ESTABLISHING A CONNECTION USING THE SERVER DEVICE

This application claims priority under 35 U.S.C. §119 to Japanese Patent Application No. 2004-221859 filed Jul. 29, 2004, the entire content of which is hereby incorporated by reference.

TECHNICAL FIELD

The present invention relates to a technique for establishing a connection used for transmitting and receiving data between a client device and a server device.

BACKGROUND ART

In recent years, a variety of communication services which utilize the Internet have come into use. One example of a communication protocol which is used for sending and receiving data over the Internet is TCP (Transmission Control Protocol). TCP is a connection-type communication protocol which enables highly reliable data communication to be carried out over the Internet. Under TCP, a data transmitting device (hereinafter, "server device") and a data receiving device (hereinafter, "client device") exchange connection data (hereinafter, "connection identifier") prior to transmission of content data. The exchanged connection identifier is used to specify a communication path (hereinafter, "connection") to thereby establish a connection for transmission of content data. Examples of connection identifiers include: a communication address assigned to a server device or a client device; data indicating a communication port (e.g. a communication port number) used by the devices for respectively transmitting and receiving data; or an initial value of a sequence number. Under TCP, a connection is established using a procedure referred to as a "3-way handshake". A general description of this procedure follows.

FIG. 10 provides an overview of a 3-way handshake executed by a client device 20 and a server device 40. Each of the devices is capable of communicating under TCP. It is assumed for the purposes of this explanation that a user who wishes to obtain content data from server device 40 performs a predetermined operation such as inputting data (e.g., URL) representing a communication address of server device 40 and a communication protocol to be used for acquiring the desired content data. Client device 20 first transmits to server device 40 a SYN message 200, as shown in FIG. 10. SYN message 200 is used for requesting establishment of a connection when data is to be transmitted from server device 40 to client device 20 (hereinafter, "downlink connection"); and the message includes a connection identifier for the downlink connection.

Server device 40, upon receiving SYN message 200, allocates a computer resource (hereinafter, "resource") for establishing a connection with the source of the SYN message 200, client device 20. Specifically, server device 40 writes, in a memory device such as RAM (Random Access Memory), data (e.g., a connection identifier of the downlink connection mentioned above) for identifying a correspondent device (i.e., client device 20). Server device 40 then transmits to client device 20 a SYN/ACK message 210 indicating receipt of SYN message 200, and also transmits a request for establishing a connection in the reverse direction (hereinafter, "uplink connection"). The uplink connection is used when data is transferred from client device 20 to server device 40; and the SYN/ACK message 210 includes a connection identifier for the uplink connection.

Client device 20, upon receiving SYN/ACK message 210, reads the connection identifier in the SYN/ACK message 210 and establishes a connection (i.e., an uplink connection) in accordance with the connection identifier. Client device 20 then transmits to server device 40 an acknowledgement message (hereinafter, "ACK") 220 indicating receipt of the SYN/ACK message 210. Upon receiving ACK 220, server device 40 establishes the uplink connection, deletes data identifying the correspondent device from the memory device, and awaits receipt of a message from the correspondent device, such as a request for transmitting data.

It is to be noted that since resources of server device 40, such as a capacity of a memory device, are limited, a number of connection identifiers which can be stored in the memory device is also accordingly limited. Thus, a number of ACKs 220 from client devices 20 for which server device 40 can wait is limited to a number of connection identifiers which can be retained at the server. It is this limitation that makes a server vulnerable to abuse. Namely, a denial of service attack can be launched against the server by a malicious client device by sending from the device a large number of SYN messages 200 to the server for queuing, thereby exhausting the resources of the server. Such an attack is referred to as a "SYN Flood Attack."

When a SNY Flood Attack is launched, a malicious client device which is the source of the attack continuously transmits a large number of SYN messages 200 to server device 40. When the server sends or attempts to send responsive SYN/ACK messages 210 no ACK 220 is forthcoming from the client device, and the server therefore retains for a set time period connection identifiers contained in the received SYN messages. When a number of connection identifiers queued at the server reaches an upper limit, the resources of the server device are exhausted. As a result, the server device is no longer able to accept connection requests from client devices; and communication services cannot be provided. Various methods have been proposed for dealing with SYN Flood Attacks. They include, J. Lemon, "Resisting SYN flood DoS attacks with a SYN cache", Proceedings of the BSDCon 2002 Conference, 2002 where a technique called SYN Cookie is described. Referring to FIG. 11, a description of SYN Cookie will now be given.

FIG. 11 provides an overview of a connection opening procedure carried out according to SYN Cookie. When a server device 50 establishes a connection according to SYN Cookie when receiving a SYN message 200 from client device 50, it generates hash data by compressing the content of the received SYN message 200 according to a predetermined algorithm. Server device 50 then transmits to client device 20 a SYN/ACK message 210 after writing the generated hash data in the message 210. According to SYN Cookie, server device 50 does not write in its memory unit a connection identifier contained in SYN message 200 at the time of receiving the message 200. Instead, server device 50 reads a connection identifier from the hash data if the hash data is contained in an ACK 220 returned from client device 20, and then establishes a connection (i.e., downlink connection) based on the connection identifier. Thus, according to SYN Cookie, since server device 50 does not store a connection identifier contained in a SYN message 200, there is no danger of resources of server device 50 being exhausted even in a case that ACKs 220 are not returned from a client device(s). Accordingly, server device 50 is able to avoid a denial of service state from being created by a SYN Flood Attack.

However, given that TCP provides that a message be retransmitted if an ACK is not returned from a correspondent device within a predetermined time after transmission of a message, as shown in FIG. 11, server device 50 according to SYN Cookie must retransmit SYN/ACK message 210 in a case that ACK 220 is not received within a predetermined time after the transmission of SYN/ACK message 210. However, since server device 50 does not store a connection identifier contained in SYN message 200, it cannot retransmit SYN/ACK message 210 as it is unable to identify a destination of SYN/ACK message 210 for retransmission; this destination would conventionally be identified on the basis of a stored connection identifier.

As a consequence, a connection between server device 50 and client device 20 remains incomplete if ACK 220 is not transmitted to server device 50 from client device 20 in response to SYN/ACK message 210, or is transmitted but is lost in transmission and fails to reach server device 50. Specifically, while an uplink connection between server device 50 and client device 20 is established if client device 20 safely receives SYN/ACK message 210, a downlink connection is not established due to the loss of ACK 220. That is, an incomplete, half-open state of connection is created between server device 50 and client device 20. This half-open communication state once created will persist since a downlink connection will not be established if SYN/ACK message 210 cannot be retransmitted to thereby cause client device 20 to retransmit ACK 220. Thus, using SYN Cookie to deal with a SYN Flood Attack is liable to give rise to a problem that a connection between a server device and a client device remains incomplete.

BRIEF SUMMARY

The present invention has been envisioned in view of the problem described above, and has as its object the provision of effective protection against SYN Flood Attacks, while avoiding the creation of an incomplete, half-open connection state between a client device and a server device.

To solve the above-stated problem, in one aspect, the present invention provides a server device comprising: receiving means for receiving a message transmitted from a correspondent device; transmission means for transmitting to the correspondent device, when a first message is received by the receiving means, a second message requesting establishment of an uplink connection to be used for receiving data transmitted from the correspondent device, the first message containing an identifier identifying a downlink connection to be used for transmission of data to the correspondent device, and for requesting establishment of the downlink connection; reading means for reading, when a third message is received by the receiving means, the identifier from the third message, the third message containing the identifier, requesting establishment of the downlink connection, and acknowledging receipt of the second message; and connection establishing means for establishing the downlink connection with the correspondent device based on the identifier read by the reading means.

In another aspect, the present invention provides a program for causing a computer to function as receiving means for receiving a message transmitted from a correspondent device; transmission means for transmitting to the correspondent device, when a first message is received by the receiving means, a second message requesting establishment of an uplink connection to be used for receiving data transmitted from the correspondent device, the first message containing an identifier identifying a downlink connection to be used for transmission of data to the correspondent device, and for requesting establishment of the downlink connection; reading means for reading, when a third message is received by the receiving means, the identifier from the third message, the third message containing the identifier, requesting establishment of the downlink connection, and acknowledging receipt of the second message; and connection establishing means for establishing the downlink connection with the correspondent device based on the identifier read by the reading means, and a computer readable recording medium which has stored the program.

According to such a server device, program, and recording medium, when it is confirmed by receiving the third message that a client device which is a correspondent device has received the second message, a downlink connection is established between the client device.

In a preferred embodiment, the reading means reads additional data in addition to the identifier in a case where the third message contains the additional data specifying a communication mode for transmitting data to the correspondent device via the downlink connection; and the connection establishing means establishes the downlink connection based on the identifier and the additional data read by the reading means.

According to this preferred embodiment, after the downlink connection is established, communication can be performed with the client device according to a communication mode specified by the additional data. In other words, an incomplete connection state can be avoided from persisting, and a SYN Flood Attack can be effectively handled; and moreover, communication with the client device can be performed in a fine-tuned mode.

In still another preferred embodiment, the server device further comprises determination means for determining based on content of the first and third messages whether a source of the first message is identical to that of the third message, wherein the reading means reads the identifier from the third message only when a result of the determination is affirmative. Preferably, the first and third messages each may contain sequence number data showing an initial value of sequence number of a message used by each source of the first and third messages when transmitting data; and the determination means may determine that the source of the first message is identical to that of the third message when the sequence number data contained in the first message is identical to the sequence number data contained in the third message.

According to this preferred embodiment, a downlink connection between the correspondent device is established when a source of the first message is the same as that of the third message.

According to yet another preferred embodiment, the receiving means may discard a message transmitted from a correspondent device if the message contains additional data in a predetermined area; and the transmission means transmits the second message after writing the additional data in the predetermined area. Preferably, the server device may further comprise determination means for determining based on a content of the first message whether the first message received by the receiving means is transmitted via a particular communication port; and the transmission means transmits the second message after writing the additional data in the predetermined area in a case where it is determined by the determination means that the first message is transmitted via the particular communication port.

According to this preferred embodiment, in a case where a correspondent device impersonating a first server device of the present embodiment transmits the first message to a second server device of the present embodiment, the second server device transmits, to the first server device, the second message after writing the additional data in the predetermined area of the second message. The second message is then discarded by the first device. As a result, endless transmission of a message between the first and the second server device can be avoided.

In another aspect, the present invention provides a server device comprising: communication means and control means, wherein the control means performs: a first process of transmitting by the communication means a second message requesting establishment of an uplink connection to be used for receiving data from a correspondent device, in a case where a first message is received by the communication means, the first message containing an identifier identifying a downlink connection to be used for transmission of data to the correspondent device, and the first message also requesting establishment of the downlink connection; a second process of reading the identifier from a third message when the third message is received by the communication means, the third message containing the identifier, requesting establishment of the downlink connection, and acknowledging the second message; and a third process of establishing the downlink connection based on the identifier read in the second process.

In still another aspect, the present invention provides a program for causing a computer device to execute a first process of transmitting by the communication means a second message requesting establishment of an uplink connection to be used for receiving data from a correspondent device, in a case where a first message is received by the communication means, the first message containing an identifier for identifying a downlink connection to be used for transmission of data to the correspondent device, and the first message also requesting establishment of the downlink connection; a second process of reading the identifier from a third message when the third message is received by the communication means, the third message containing the identifier, requesting establishment of the downlink connection, and acknowledging the second message; and a third process of establishing the downlink connection based on the identifier read in the second process, the invention also providing a computer readable medium on which the program is stored.

According to such a server device, program, and computer readable medium, a downlink connection is established between a client device in a case that it is confirmed by the third message that the client device being a correspondent device has received the second message.

To solve the above-stated problem, the present invention futher provides a control method of controlling a server device which establishes a connection between a correspondent device and transmits data to the correspondent device, wherein the server device is caused to sequentially perform: a first step of transmitting a second message requesting for establishment of an uplink connection to be used for receiving data from a correspondent device, in a case where a first message is transmitted from the correspondent device, the first message containing an identifier for identifying a downlink connection to be used for transmission of data to the correspondent device and the first message also requesting establishment of the downlink connection; a second step of reading the identifier from a third message when the third message is transmitted from the correspondent device, the third message containing the identifier, requesting establishment of the downlink connection, and acknowledging the second message; and a third step of establishing the downlink connection based on the identifier read in the second step.

In another aspect, the present invention provides a connection establishment method of controlling a server device which establishes a connection between a correspondent device and transmits data to the correspondent device, wherein the server device is caused to sequentially perform: a first step of transmitting a second message requesting establishment of an uplink connection to be used for receiving data from a correspondent device, in a case where a first message is transmitted from the correspondent device, the first message containing an identifier for identifying a downlink connection to be used for transmission of data to the correspondent device, and the first message also requesting for establishment of the downlink connection; a second step of reading the identifier from a third message when the third message is transmitted from the correspondent device, the third message containing the identifier, requesting establishment of the downlink connection, and acknowledging the second message; and a third step of establishing the downlink connection based on the identifier read in the second step.

According to this connection establishment method, a downlink connection is established between a client device and a server device in a case that the server device confirms by the third message that the client device has received the second message.

According to the present invention, upon establishing a connection between a client device and a server device, an incomplete connection state can be prevented from persisting, and a SYN Flood Attack can be effectively handled.

BRIEF DESCRIPTION OF THE DRAWINGS

FIG. 3 is a diagram showing an example of a hardware configuration of server device 30.

FIG. 4 is a flowchart showing a flow of a control operation executed by a control unit 100 of server device 30 according to control software.

FIG. 5 is a diagram showing an example of a communication sequence performed between server device 30 and a client device 20 for establishing a connection.

FIG. 6 shows an example of a communication sequence performed when an ACK 220 transmitted from server device 30 is lost.

FIG. 9 shows an example of a communication sequence performed when a client device 20 impersonates a server device 40 and transmits a SYN message to a server device 30A according to Modification 4.

FIG. 11 is a diagram illustrating a conventional SYN Cookie.

DETAILED DESCRIPTION OF THE PREFERRED EMBODIMENTS

In the following, description will be given of a preferred embodiment of the present invention with reference to the attached drawings.

A: Configuration

A-1: Configuration of Communication System

Figure 1:
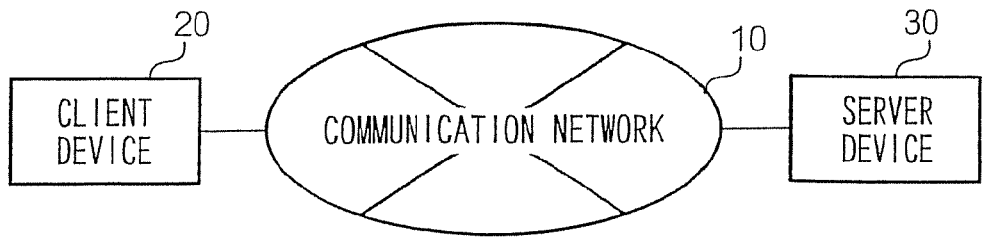
FIG. 1 shows an example of a communication system comprising a server device 30 according to an embodiment of the present invention.

FIG. 1 is a diagram showing an example of an overall configuration of a communication system comprising a server device 30 according to an embodiment of the present invention. As shown in FIG. 1, the communication system comprises a communication network 10, a client device 20 and server device 30 connected to communication network 10. While, in FIG. 1, there are shown only one client device and one server device connected to communication network 10, a number of client devices and/or a number of server devices may be connected to communication network 10. Hereinafter, a client device and a server device will be collectively referred to as a communication device where distinction between the two is unnecessary.

As shown in FIG. 1, communication network 10 may be, for example, the Internet; and it comprises relay devices such as a router, a gateway, and the like. Communication network 10, when a message is transmitted from a communication device connected to the network according to a predetermined protocol (TCP in the present embodiment), delivers the message to its destination by routing the message via the relay devices. In the present embodiment, description will be given of a case where communication network 10 is the Internet; but communication network 10 may also be a LAN (Local Area Network), a mobile packet communication network, a wireless communication network such as a wireless LAN, and so on.

Client device 20 and server device 30 in FIG. 1 are personal computers (hereinafter, "PC") connected to communication network 10; and they are capable of performing communication according to TCP through communication network 10. Specifically, client device 20 and server device 30 generate a message under a format shown in FIG. 2, and transmit the message after writing predetermined data in an area of the header portion of the message.

Figure 2:
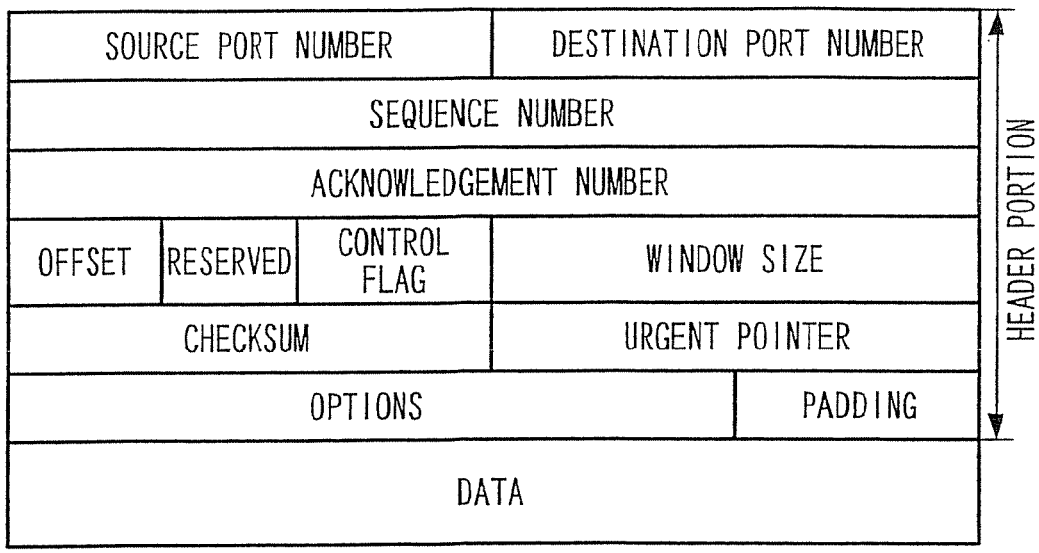
FIG. 2 is a diagram showing a message format of a message exchanged according to TCP.
Figure 10:
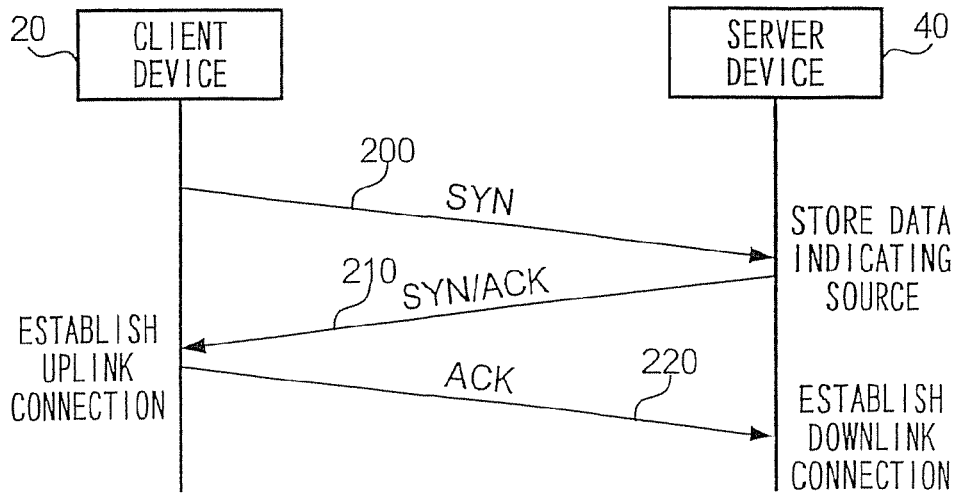
FIG. 10 is a diagram illustrating a conventional 3-way handshake.

The format shown in FIG. 2 is that for a message transmitted according to TCP. Though detailed graphic representation is omitted, a control flag area of FIG. 2 is an area for writing 6 bit flags: URG, ACK, PSH, RST, SYN, and FIN. Client device 20 and server device 30 sets "1" or "0" to each of these 6 bit flags before transmitting each of the SYN, SYN/ACK, and ACK messages.

When a SYN message is transmitted from client device 20 to server device 30, respective data is written in each area of the header portion of the message. Namely, in a source port number field, a communication port number of an application (a browser, etc.) which has requested start of communication is written; in a destination port number field, a communication port number of a correspondent application (e.g., HTTPD) is written; and in a sequence number field an initial value of a sequence number used by client device 20 is written. In the control flag field, "1" is set only for the SYN flag, and "0" is set for other flags. It is to be noted, although it is not shown in FIG. 2, that a header is further appended to a message exchanged between client device 20 and server device 30 when the message is processed at a lower protocol than TCP (e.g., Internet Protocol: hereinafter "IP"). In the header added in the lower layer, there is written data representing a communication device that consitutes a destination and a source of the message (e.g., a communication address such as an IP address assigned to each device).

While description will be given in the present embodiment of a case where client device 20 and server device 30 are PCs which communicate according to TCP, client device 20 and/or server device 30 may be a PDA (Personal Digital Assistance) or a mobile phone which communicate according to TCP in so far as the device is such as is capable of communicating according to TCP.

Detailed description of client device 20 of the communication system shown in FIG. 1 will be omitted since client device 20 is the same as a conventional computer device which communicates according to TCP. Conversely, server device 30 is provided with functions particular to the server device of the present invention by which a connection is established according to the connection establishment method of the present invention. The following description therefore centers on server device 30 of the present invention.

A-2: Configuration of Server Device 30

Description will be now given of server device 30 with reference to FIG. 3. As shown in the figure, server device 30 has a control unit 100, a communication interface (hereinafter, "IF") unit 110, a memory device 120, and a bus 130 which interconnects each unit of the device 30.

Control unit 100 is, for example, a CPU (Central Processing Unit), and controls each unit of server device 30 by running software stored in memory device 120. Communication IF unit 110, which is connected to communication network 10, receives a message transmitted via communication network 10, passes the message over to control unit 100, and transmits a message passed from control unit 100 to communication network 10.

Memory device 120, as shown in FIG. 3, comprises a volatile memory 120a and non-volatile storage device 120b. Volatile memory 120a is, for example, a RAM, and is used as a work area by control unit 100 operating according to software. Non-volatile storage device 120b is for example a hard disk, in which a variety of data is stored. Examples of data stored in non-volatile storage device 120b include transmission data to be transmitted to client device 20 in response to a request from client device 20, and data defining a communication mode for transferring the transmission data to client device 20 according to TCP (e.g., data showing a congestion window size, a timeout value, and so on).

Further, there is stored in non-volatile storage device 120b an operating system (hereinafter, OS) software for causing control unit 100 to realize OS functions, and control software for causing control unit 100 to perform communication according to TCP. Hereinafter, description will be given of functions provided by control unit 100 upon executing the OS and control software.

When server device 30 is turned on, control unit 100 first runs and executes the OS software from non-volatile storage device 120b. Control unit 100 operating according to the OS software is provided with a function of controlling each unit of server device 30 and also with a function of running and executing other software from non-volatile storage device 120b. When control unit 100 completes the execution of the OS software, control unit 100 which has realized the OS immediately runs and executes the above control software from non-volatile storage device 120b.

A control unit 100 operating according to the control software executes the following three processes when it receives a SYN message or SYN/ACK message from client device 20 according to a procedure shown in the flowchart of FIG. 4. A first process is carried out when a SYN message requesting to establish a downlink connection is transmitted from client device 20, and consists of generating a SYN message requesting establishment of an uplink connection for transmission to client device 20 (Step SA3, FIG. 4). A second process is carried out when a SYN/ACK message is received acknowledging receipt of the SYN message transmitted in the first process requesting the establishment of the downlink connection, and consists of acquiring a connection identifier for identifying the downlink connection by reading the identifier from the SYN/ACK message (Step SA4). A third process consists of establishing the downlink connection based on the connection identifier acquired in the second process (Step SA5). Thus, the control software causes control unit 100 of server device 30 to realize a control method particular to the present invention, and to execute a connection establishment method particular to the present invention.

In other words, the control software causes control unit 100 to provide the four following functions: first, to function as a receiving means for receiving a message transmitted from a client device through a communication IF unit 110; second, to function as a transmission means for, when a message received by the receiving means is a SYN message requesting to open a downlink connection with client device 20, generating a SYN message requesting establishment of an uplink connection for transmission to client device 20; third, to function as a reading means for reading, when a message received by the receiving means is a SYN/ACK message which acknowledges a SYN message transmitted by the transmission means and requests that the downlink connection be established, a connection identifier for identifying the downlink connection from the SYN/ACK message; and, fourth, to function as a connection establishing means for establishing the downlink connection based on the connection identifier read by the reading means.

As in the foregoing, a hardware configuration of server device 30 is the same as that of a general computer device, except that a variety of software stored in memory device 120 is run and executed by control unit 100, whereby control unit 100 is caused to realize functions particular to the server device of the present invention. Thus, a control method according to the present invention is realized, and a connection establishment method according to the present invention is executed by client device 20 and server device 30. In the present embodiment, description is given of a case where functions particular to the server device of the present invention are realized according to a software module. It is, of course, possible to configure a server device 30 using a hardware module having the same functions as the software module; i.e., server device 30 may be configured by realizing the receiving means, the transmission means, and the reading means, and the connection establishing means by using a hardware module.

B: Operation

Description will be next given of an operation performed by server device 30, and in particular of an operation which when carried out clearly shows the characteristics of the device 30.

B-1: Basic Operation

Description will be first given of a flow of an operation performed by client device 20 and server device 30 upon establishing a connection. Since client device 20 is the same as a conventional communication device which performs communication according to TCP, client device 20, when a user performs a predetermined operation such as entering a URL of server device 30, transmits SYN message 200 to server device 30, as shown in FIG. 5. In the following, description will be given, with reference to FIG. 4, of an operation performed by control unit 100 of server device 30 upon receiving SYN message 200.

Control unit 100 of server device 30, when it receives a message through communication IF unit 110, as shown in FIG. 4 (Step SA1), determines based on the content of the message whether the message is a SYN message or a SYN/ACK message (Step SA2). Specifically, control unit 100 determines when "1" is set only for the SYN flag of a control flag (FIG. 2) contained in the message, that the message is a SYN message; while it determines that the message is a SYN/ACK message when "1" is set to the ACK flag in addition to the SYN flag. In a case that control unit 100 determines that the received message is a SYN message in Step SA2, it performs the process of Step SA3 in FIG. 4; while when control unit 100 determines that the received message is a SYN/ACK message in Step SA2, it executes the processes from Steps SA4 to SA6.

In the present operation example, SYN message 200 is transmitted from client device 20. As a result, the process of Step SA3 is performed. In Step SA3, control unit 100 transmits to a source of a SYN message received in Step SA1, i.e., client device 20, a SYN message requesting establishment of an uplink connection. As a result, as shown in FIG. 5, a SYN message 205 is transmitted from server device 30 to client device 20.

Client device 20, which has the same functions as a conventional client device capable of communicating according to TCP, operates on the assumption that a connection is established simultaneously when SYN message 205 is received; and simultaneous establishment of a connection is assumed to occur in a case where client device 20 and its correspondent device each transmit a SYN message essentially simultaneously, and receive a SYN message transmitted by the other of the devices before receiving an ACK. (For "simultaneous open", refer to W. Richard Stevens, Tcp/Ip Illustrated: The Protocols (Addison-Wesley Professional Computing Series), pp. 250-251 Addison-Wesley Pub (Sd), 1994). Thus, by causing server device 30 to transmit SYN message 205 to client device 20, it is assumed at client device 20 that a simultaneous open occurs. Since, according to TCP, it is provided that a SYN/ACK message should be returned as a response to a SYN message transmitted from a correspondent device, client device 20 then transmits to server device 30 a SYN/ACK message 210 acknowledging SYN message 205 and requesting establishment of a downlink connection (FIG. 5). SYN/ACK message 210 contains the same data as that contained in SYN message 200, which data contains information required for establishing a downlink connection, such as a connection identifier, while an acknowledgement number (FIG. 2) is incremented.

Control unit 100 of server device 30, upon receiving SYN/ACK message 210 via communication IF unit 110 (Step SA1), performs the processes of Steps SA4 to SA6 as described above. Specifically, control unit 100 obtains the connection identifier of a downlink connection by reading it from SYN/ACK message 210 received from client device 20 (Step SA4) and establishes a connection represented by the connection identifier (Step SA5). As a result, a downlink connection between client device 20 and server device 30 is established. Control unit 100 then transmits to client device 20 an ACK 220 acknowledging the above SYN/ACK message 210 after writing therein a connection identifier of an uplink connection (Step SA6). When the ACK 220 reaches client device 20, client device 20 reads the connection identifier written in the ACK 220 to establish a connection, i.e., an uplink connection, indicated by the connection identifier.

Thus, since server device 30 according to the present embodiment does not store a connection identifier (i.e., a connection identifier of an uplink connection) written in SYN message 200 at the time of receiving SYN message 200 transmitted from client device 20, SYN Flood Attack can be effectively handled.

B-2: Operation when ACK 220 or SYN/ACK 210 is Lost

In the foregoing, description is given of a case where each message transmitted from client device 20 and server device 30 reaches its destination. In the following, description will be given of an operation performed by client device 20 and server device 30 in a case where a message is lost within communication network 10.

Description will be first given of a case where ACK 220 transmitted from server device 30 to client device 20 is lost. ACK 220 serves to notify client device 20 that SYN/ACK message 210 transmitted from client device 20 is safely received at server device 30. When an ACK 220 is not received at client device 20 within a predetermined time (e.g., Tc secs. refer to FIG. 6) following transmission of SYN/ACK message 210, it is assumed that the SYN/ACK message 210 has been lost, and the client device 20 retransmits SYN/ACK message 210. As shown in FIG. 6, server device 30 retransmits an ACK 220 upon receiving the retransmitted SYN/ACK message 210.

Thus, according to the present embodiment, even if an ACK transmitted from server device 30 to client device 20 is lost, client device 20 retransmits SYN/ACK message 210 and thereby prompts server device 30 to retransmit ACK 220. SYN/ACK message 210 is also retransmitted even if SYN/ACK message 210 transmitted from client device 20 is lost, since the SYN/ACK message 210 is retransmitted after a predetermined time following transmission of the SYN/ACK message 210.

Further, according to the present embodiment, description is given of a case where ACK 220 is regarded as an ACK for SYN/ACK message 210. This means that a timer (not shown) for measuring a predetermined time following the transmission of SYN message 200 is stopped when SYN message 205 is received after SYN message 200 is transmitted, and is started again when SYN/ACK message 210 is transmitted to measure the predetermined time (Tc, FIG. 6). However, the timer need not necessarily be stopped when SYN message 205 is received after the transmission of SYN message 200, and if it is not, ACK 220 will be regarded as an acknowledgment for SYN message 200. Accordingly, SYN message 200 can be retransmitted if ACK 220 is not received within a predetermined time following transmission of SYN message 200.

B-3: Operation when SYN Message 205 or 200 is Lost

In a case where SYN message 205 transmitted from server device 30 is lost, SYN/ACK message 210 for acknowledging the SYN message 205 will not be returned to server device 30. In such a case, SYN message 205 has to be retransmitted when a predetermined time elapses following transmission of the SYN message 205. However, since server device 30 does not store data showing a source of SYN message 200 at the time of receiving the SYN message 200, server device 30 is unable to identify a destination of a SYN message 205 to be retransmitted, and accordingly the retransmission cannot be performed.

Figure 7:
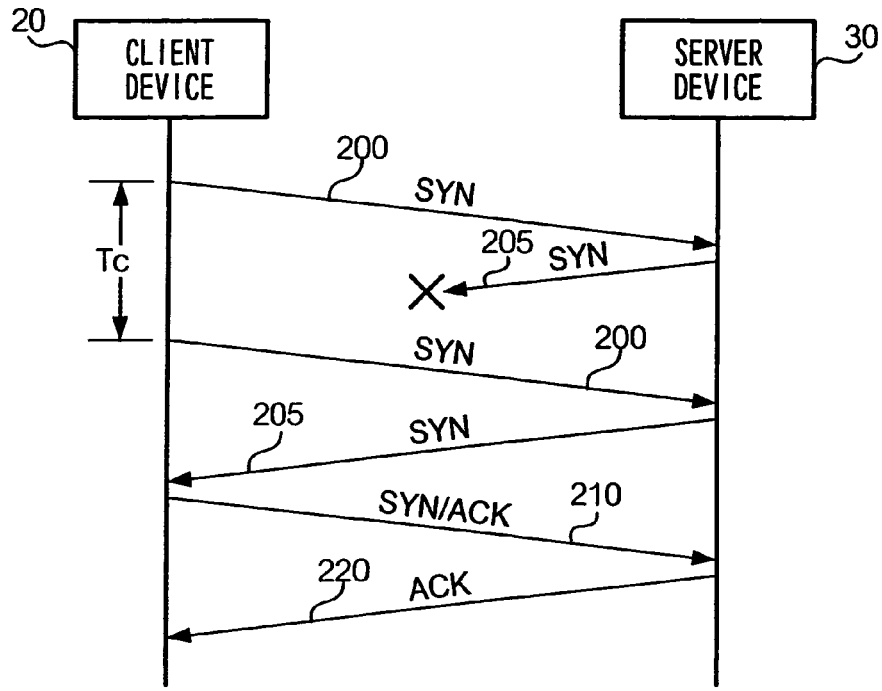
FIG. 7 shows an example of a communication sequence performed when a SYN message 205 transmitted from client device 20 is lost.

Nevertheless, according to the present embodiment, a SYN message 200 is retransmitted from client device 20 after a predetermined time elapses following transmission of SYN message 200, as shown in FIG. 7. Server device 30 is then caused to retransmit SYN message 205. It will be apparent to those skilled in the art that, in a case where SYN message 200 transmitted from client device 20 is lost, the message is retransmitted after the predetermined time elapses following the transmission of SYN message 200.

As has been described, according to the present embodiment, a message can be always retransmitted even if a message to be exchanged between client device 20 and server device 30 is either not transmitted or is lost. Thus, it is possible to prevent a connection between server device 30 and client device 20 from remaining in an incomplete state.

C: Modification

In the foregoing, description has been given of a preferred embodiment of the present invention. However, modifications may be made as described in the following.

C-1: Modification 1

In the above embodiment, description is given of a case where a client device and a server device communicate according to TCP. However, a connection established according to a connection establishment method of the present invention is not limited to a connection to be used for data communication performed according to TCP, but may be a connection for data communication performed according to another communication protocol as far as a communication protocol is a connection-type communication protocol such as TCP which establishes a connection prior to the exchange of data. Further, as described above, it is possible to avoid an incomplete state of connection persisting if a retransmission means is provided with a communication device for retransmitting a message for which an acknowledgement is not received within a predetermined time period elapses since the transmission of the message even if a connection-type communication protocol other than TCP is used.

C-2: Modification 2

In the above embodiment, description is given of a case where a server device reads a connection identifier from a SYN/ACK message upon receiving the SYN/ACK message from a client device and establishes a downlink connection indicated by the connection identifier. Moreover, in a case where there is written in the Option Field (refer to FIG. 2) of the SYN/ACK message, additional data specifying details of a communication mode for use in transmitting data through the above connection to client device 20, a server device may, after establishing the downlink connection, transmit data in a communication mode specified by the additional data. Examples of the additional data are data showing availability of various options such as Window Scale Option and Timestamp Option, data indicating the availability of Selective Acknowledgement (SACK) and ECN. Thus, according to the present modification, communication can be performed in a fine-tuned mode depending on a capacity of a correspondent device using a connection established according to the connection establishment method of the present invention.

C-3: Modification 3

In the above embodiment, description is given of a case where a server device, when it receives a SYN/ACK message transmitted from a client device, unconditionally establishes a downlink connection with client device 20. However, it is also possible to authenticate whether a client device which is a source of a SYN message is identical to a client device which is a source of a SYN/ACK message, so as to establish a downlink connection only when the two client devices are authenticated as being identical.

In more detail, a server device of the above embodiment is further provided with a hash data generation means for generating hash data from by compressing the content of a received message according to a predetermined algorithm. A server device is then caused to transmit a SYN message 205 requesting for establishment of an uplink connection, after writing in the SYN message 205 hash data generated from based on SYN message 200 transmitted from a client device by the hash data generation means. If a SYN/ACK message received from a client device contains the hash data, it is determined that the client device which has transmitted the SYN message 200 is identical to the client device which has transmitted the SYN/ACK message, and a server device then reads a connection identifier identifying the downlink connection from the SYN/ACK message.

C-4: Modification 4

In the above embodiment, description is given of a case where a server device, when it receives a SYN message requesting for establishment of a downlink connection from a client device, unconditionally returns a SYN message requesting for establishment of an uplink connection to the client device. However, in a case that the above client device uses a particular communication port (e.g., a communication port which is a well-known port) to transmit a SYN message, a server device may transmit a SYN message 205 with predetermined additional data written in a predetermined area of the message 205. The rationale for the present modification will be elaborated in the following.

A client device performing communication according to TCP generally transmits a SYN message using a communication port called ephemeral ports. The ephemeral ports are communication ports for which no particular use is predefined and a client device can freely decide their use. Well-known ports are communication ports for which a use is predefined. For example, a port number 80 is used for communication performed according to HTTP.

In a case where a client device impersonates another communication device, i.e., another server device, such a client device generally transmits a SYN message via well-known ports conventionally used by the server device. In other words, a client device which transmits a SYN message using a well-known port is likely to be impersonating another server device.

It is assumed, for example, that client device 20 transmits to a server device 30A a SYN message in which a communication address assigned to a server device 30B (hereinafter, "AdrB") is written as a source address and "80" is written as a source port number, wherein both server devices 30A and 30B have the same functions as server device 30 of the above embodiment. Server device 30A, when it receives the SYN message, detects that a source of the message is server device 30B based on the data contained in the SYN message and transmits a SYN message requesting establishment of an uplink connection to server device 30B. Since this is the first time that server device 30B has received a SYN message from server device 30A, it returns a SYN message to server device 30A. From then on, a SYN message would be transmitted and received between server device 30A and 30B without end.

Thus, since when a SYN message is transmitted from a client device using a particular communication port (e.g., well-known port) which a general client device does not use, it can be inferred that the client device is impersonating another device, and endless exchange of SYN messages can be stopped by writing in a predetermined area of a SYN message 205 additional data indicating impersonation.

To elaborate, description will be given of two cases: that where client device 20 impersonates a server device of the present invention; and that where client device 20 impersonates a conventional server device. In the following, URG flag of a control flag field (FIG. 2) is used as an area for writing the additional data, and 1-bit data of either "1" or "0" is written as the additional data. Alternatively, the additional data may be written in the Option Field shown in FIG. 2.

Figure 8:
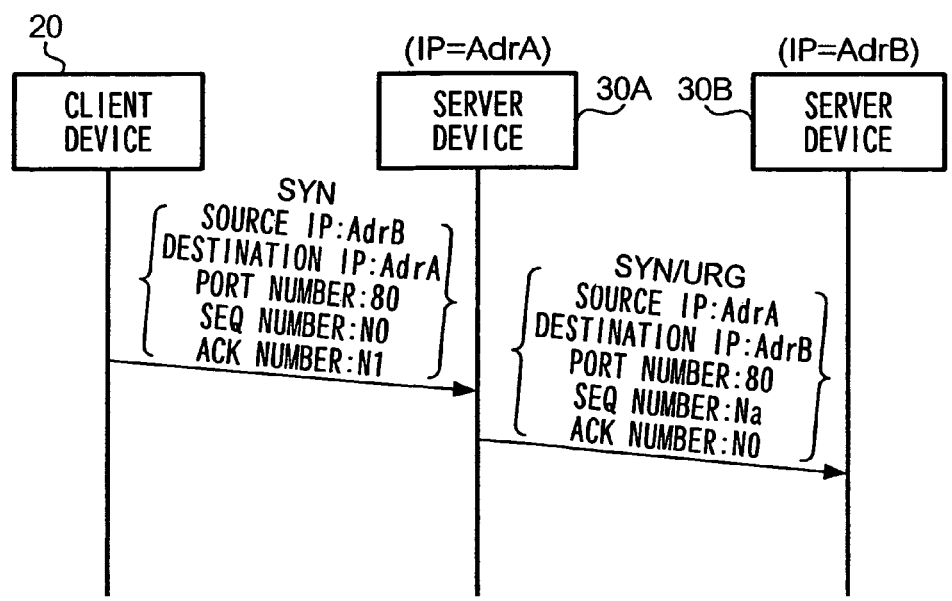
FIG. 8 shows an example of a communication sequence performed when a client device 20 impersonates a server device 30B and transmits a SYN message to a server device 30A according to Modification 4.

FIG. 8 is a diagram showing a communication sequence for a case where client device 20 impersonates a server device 30B of the present modification and transmits a SYN message to server device 30A of the present modification. Server device 30A, when it receives the SYN message, determines whether a communication port used for the transmission of the SYN message is a particular communication protocol (e.g., well-known port) based on the data contained in the SYN message (e.g., a connection identifier contained in the SYN message). Server device 30A, when a result of the determination is affirmative, transmits a SYN message (hereinafter, a SYN/URG message) in which "1" is set in URG flag of the control flag field.

Since client device 20 is impersonating server device 30B, server device 30A transmits the above SYN/URG message to server device 30B as shown in FIG. 8. On the other hand, server device 30B receives the above SYN/URG message in a state where no message such as a SYN message exchange is performed (e.g., a LISTEN state according to TCP). To avoid endless exchange of SYN message, server device 30B is caused to abandon the SYN/URG message when server device 30B enters such a state.

Description will be next given of a second case where client device 20 impersonates a conventional server device 40 and has transmitted a SYN message to server device 30, with reference to FIG. 9. First, server device 30 transmits a SYN/URG message to server device 40 upon receiving a SYN message in the same way as the above case shown in FIG. 8.

Server device 40 of FIG. 9 is a conventional server device which communicates according to TCP, and upon receiving the above SYN/URG message it transmits a SYN/ACK message to a source of the SYN/URG message. In this case, as shown in FIG. 9, a sequence number (Nb) contained in the SYN/ACK message is a number that is independent of and unrelated to a sequence number (N0) of a SYN message written in the SYN message transmitted from client device 20, since the server device 40 independently sets as the sequence number of the SYN/ACK message a random initial sequence number. On the other hand, if client device 20 is not impersonating another server device, when a SYN/URG message is returned from a server device 30 of the present embodiment as a response to an initial SYN message transmitted from client device 20 to server device 30, client device 20 determines that it is in a simultaneous connection state and transmits to server device 30 a SYN/ACK message which contains the same data as that contained in the intial SYN message transmitted to server device 30, after incrementing the acknowledgement number. Thus, a source of a SYN/ACK message can be determined as being the same as that of the initial SYN message in a case where a sequence number written in the SYN/ACK message is the same as that contained in the SYN message. In other words, server device 30 determines that a SYN/ACK message is an illicit message in a case that a sequence number written in the SYN/ACK message is not the same as that contained in a SYN message which was received prior to the receipt of the SYN/ACK message, and server device 30 is then caused to transmit an RST (RESSET) message. As a result, an operation of establishing a connection is suspended, and endless exchange of SYN messages is prevented.

In the present modification 4, in a case that a particular communication port is used for a SYN message transmitted from a correspondent device, server device 30A is caused to return a SYN message containing additional data to that effect. However, server device 30 may add additional data to a SYN message as a response to every SYN message transmitted from a correspondent device regardless of whether the SYN message transmitted from the correspondent device was transmitted using a particular communication port, since a correspondent device impersonating another device may not necessarily use the particular communication port in transmitting a SYN message.

C-5: Modification 5

In the above embodiment, there is stored in advance in non-volatile storage device 120 software for causing control unit 100 to realize functions particular to the server device of the present invention. For storing the software, there may be used as the non-volatile storage device, in addition to a hard disk, other media such as a CD-ROM (Compact Disk Read Only Memory), DVD (Digital Versatile Disk) and the like, and the software may be installed to a general computer device using such media. In this way, it is made possible for a server device in an existing communication system to function as a server device according to the present invention.

C-6: Modification 6

In the above embodiment, server device 30 is caused to transmit SYN message 205, every time it receives SYN message 200 from client device 20, so that SYN/ACK message 210 is transmitted from client device 20. Alternatively, server device 30 may transmit SYN message 205 as a response to SYN message 200 received from client device 20 only when it is determined that resources available at server device 30 are scarce. Specifically, CPU 100 of server device 30 monitors available capacity of a memory unit such as a RAM, for example by continuously updating data of a percentage value showing occupied memory area in relation to the whole memory capacity. When SYN message 200 is received from client device 20, it is determined whether an available capacity of the memory unit exceeds a certain threthold of the percentage value. When it is determined negative, a SYN/ACK message is transmitted to client device according to the conventional 3-way handshake method; and when it is determined that the available capacity of the memory unit exceeds a certain threshold, i.e., when it is determined that resources available at server device 30 are scarce, SYN message 205 is transmitted to client device 20. Thus, since the conventional 3-way handshake method is used during normal operation, and the connection establishment method of the present invention is used only when resources available at the server device are found to be scarce, any potential adverse effect of overhead caused by transmitting one extra message of the method of the present invention is minimized. Thus, a SYN Flood attack can be effectively handled.

The invention claimed is:

1. A connection establishment method, comprising sequential steps of:
    a first step of transmitting from a client device to a server device a first message requesting establishment of a downlink connection used for receiving data;
    a second step of transmitting from said server device, in response to receipt of said first message, a second message requesting establishment of an uplink connection used for receiving data from said client device;
    a third step of transmitting, from said client device which has received said second message, to said server device a third message acknowledging said second message and requesting establishment of said downlink connection;
    a fourth step of establishing at said server device which has received said third message, said downlink connection based on content of said third message;
    wherein said first message and said third message each contain sequence number data comprising an initial value of a sequence number of a message, and said fourth step further comprises confirming that said first message and said third message from said client device both originated from a single device based on confirmation that said sequence number data contained in said first message and said third message are identical; and
    a step of transmitting from said server device to said client device a fourth message acknowledging said third message, said fourth message including information to establish said uplink connection.

2. A server device configured to communicate over a network with a correspondent device, the server device comprising:
    a communication unit configured to receive a first message transmitted over said network from said correspondent device, said first message containing an identifier identifying a downlink connection for transmission of data to said correspondent device and a request to establish said downlink connection;
    said communication unit further configured to transmit to said correspondent device, responsive to receipt of said first message, a second message to request establishment of an uplink connection, said uplink connection for receipt of data transmitted from said correspondent device;
    said communication unit further configured to receive a third message from said correspondent device, said third message responsive to said second message and including said identifier, said request to establish said downlink connection, and acknowledgment of receipt of said second message;
    a processor in communication with said communication unit, said processor configured to read said identifier from said third message and establish said downlink connection with said correspondent device based on said identifier, wherein said first message and said third message each contain sequence number data comprising an initial value of a sequence number of a message, and said processor is further configured to confirm that said first message and said third message from said correspondent device both originated from a single device based on confirmation that said sequence number data contained in said first message and said third message are identical; and
    said processor further configured to transmit to said correspondent device via said communication unit a fourth message, said fourth message including acknowledgment of receipt of said third message and information to establish said uplink connection.

3. The server device according to claim 2, wherein said processor is further configured to read additional data included in said third message, said additional data specifying a communication mode for transmission of data to said correspondent device via said downlink connection, and said processor is further configured to establish said downlink connection based on said identifier and said additional data.

4. The server device according to claim 2, wherein said processor is further configured to read said identifier from said third message only when said first message and said third message are confirmed to both be originated from said single device.

5. The server device according to claim 2, wherein said communication unit is configured to receive a message, and said processor is further configured to discard said message upon confirmation with said processor that said message contains additional predetermined data in a predetermined area.

6. The server device according to claim 2, wherein said processor is further configured to generate and pass said second message to said communication unit for transmission, and said processor is further configured to generate said second message to include additional predetermined data in a predetermined area of said second message, said predetermined data included to illicit a predetermined response from said correspondent device, said predetermined response included in said third message.

7. The server device according to claim 6, wherein said processor is further configured to generate said second message to include said additional predetermined data in said predetermined area of said second message based on data included in said first message, said data included in said first message indicative that said correspondent device is other than a client device, and said additional predetermined data comprises an instruction for said server device to ignore said second message.

8. The server device according to claim 7, wherein said data included in said first message is indicative that said correspondent device is other than said client device comprises information indicative that said first message is transmitted via a pre-defined communication port.

9. A server device configured to communicate over a network with a correspondent device, the server device comprising:
   a communication unit;
   a processor in communication with said communication unit; and
   a memory device in communication with said processor, said memory device including instructions stored in said memory device and executable with said processor, said memory device comprising:
   instructions to receive from said network via said communication unit a first message, said first message containing an identifier identifying a downlink connection to transmit data to said correspondent device, said first message also containing a request to establish said downlink connection;
   instructions responsive to said request to establish said downlink connection that are executable to generate and transmit to said correspondent device via said communication unit a second message to request establishment of an uplink connection for receipt of data from said correspondent device;
   instructions to receive a third message from said correspondent device via said communication unit, said third message including said identifier, said request to establish said downlink connection, and acknowledgment of receipt of said second message;
   instructions to read said identifier included in said third message and establish said downlink connection based on said identifier read from said third message, wherein said first message and said third message each contain sequence number data comprising an initial value of a sequence number of a message, and said memory device further includes instructions to confirm that said first message and said third message both originated from a single device based on confirmation that said sequence number data contained in said first message and said third message are identical; and
   instructions to transmit to said correspondent device via said communication unit a fourth message, said fourth message including acknowledgment of receipt of said third message and information to establish said uplink connection.

10. The server device of claim 9, wherein said instructions responsive to said request to establish said downlink connection that are executable to generate and transmit to said correspondent device via said communication unit said second message are further executable to generate additional data to include in said second message, and said instructions to read said identifier included in said third message and establish said downlink connection are further executable to confirm receipt of said additional data by said correspondent device is reflected in said third message.

11. The server device of claim 10, wherein said additional data is a calculated value, and said calculated value is included in said third message.

12. The server device of claim 10, wherein said additional data is a predetermined flag and said third message includes a value also included in said second message, said third message includes said value in response to said predetermined flag being included in said second message.

13. The server device of claim 9, wherein said identifier is a first identifier, said instructions responsive to said request to establish said downlink connection that are executable to generate and transmit to said correspondent device via said communication unit the second message are further executable to include a second identifier identifying said uplink connection in said second message, and said memory device further comprises instructions to generate and transmit said fourth message via said communication unit, said fourth message comprising said second identifier identifying said uplink connection.

14. The server device of claim 9, further comprising instructions to identify said correspondent device as another server device based on said first message, and instructions to include additional predetermined data in said second message in response to said correspondent device being identified as said another server device.

15. The server device of claim 14, further comprising instructions to confirm that said third message is responsive to said additional predetermined data included in said second message.

16. The server device of claim 9, wherein said instructions responsive to said request to establish said downlink connection that are executable to generate and transmit to said correspondent device via said communication unit the second message further comprises instructions to monitor an available capacity of said server device and transmit said second message with additional predetermined data only when said available capacity reaches a determined threshold.

17. The server device of claim 16, further comprising instructions to store said identifier received in said third message in a memory unit, wherein said instructions to monitor the available capacity of said server device comprises instructions to monitor an unoccupied capacity of said memory unit, and said determined threshold is a predetermined level of unoccupied capacity of said memory unit.

18. A method of controlling a server device which establishes a connection with a correspondent device and exchanges data with said correspondent device, wherein said server device is caused to sequentially perform the method comprising:
   receiving a first message transmitted from said correspondent device, said first message containing an identifier identifying a downlink connection used for transmission of data to said correspondent device, and a request to establish said downlink connection;
   generating and transmitting a second message requesting establishment of an uplink connection used to receive data from said correspondent device, said second message generated and transmitted in response to said first message received from said correspondent device;
   receiving a third message transmitted from said correspondent device, said third message containing said identifier, said request to establish said downlink connection, and acknowledgment of receipt of said second message;

reading said identifier from said third message when said third message is received, wherein said first message and said third message each contain sequence number data comprising an initial value of a sequence number of a message;

confirming that said first message and said third message both originated from a single device based on confirmation that said sequence number data contained in said first message and said third message are identical;

establishing said downlink connection based on said identifier read from said third message and the confirmation of said sequence number data being identical; and transmitting a fourth message to said correspondent device, said fourth message including acknowledgment of receipt of said third message and information to establish said uplink connection.

* * * * *